March 9, 1926.
F. J. H. PHILLIPS
1,576,216
CYCLE, MOTOR CYCLE, AND THE LIKE
Filed Nov. 20, 1922
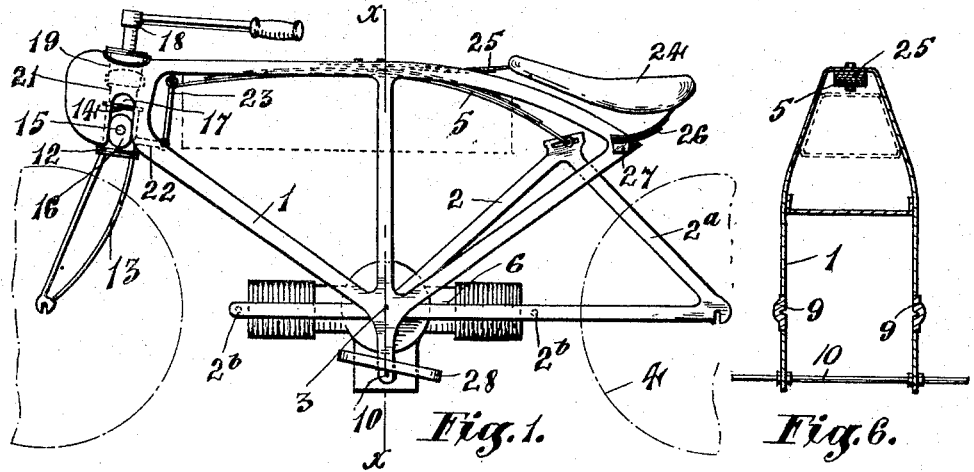
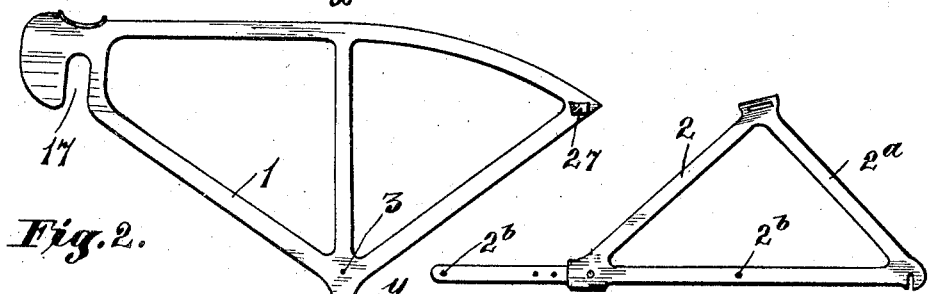
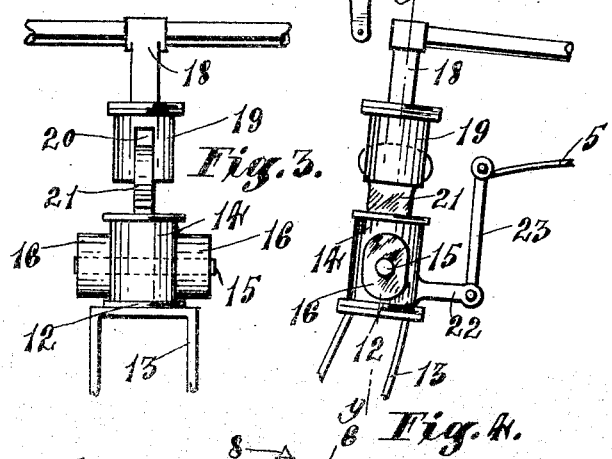
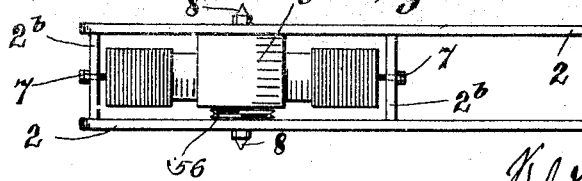

Patented Mar. 9, 1926.

1,576,216

UNITED STATES PATENT OFFICE.

FREDERICK JOHN HENRY PHILLIPS, OF LLANELLY, WALES.

CYCLE, MOTOR CYCLE, AND THE LIKE.

Application filed November 20, 1922. Serial No. 602,160.

*To all whom it may concern:*

Be it known that I, FREDERICK JOHN HENRY PHILLIPS, a subject of the King of Great Britain, residing at 18 Bryncacraw Terrace, Llanelly, Wales, have invented certain new and useful Improvements in Cycles, Motor Cycles, and the like, of which the following is a specification.

This invention comprises certain improvements in or relating to cycles, motor cycles and the like; and it has for its object an improved construction of frame work whereby road shocks or vibration will be more efficiently absorbed than is the case with machines at present constructed.

According to the present improvements not only is the rider protected from shocks and vibration, but the entire mechanism of a motor cycle is also protected from shock and vibration. In the case of a motor cycle the rear wheel and engine are mounted on a frame pivoted to the main frame of the machine, such pivoted frame being under spring control. The front fork is also sprung in an improved manner and is under the control of the spring controlling the rear wheel and parts movable therewith.

Figure 1 is a side elevation of a machine constructed according to this invention.

Figure 2 is a side elevation of the main frame.

Figure 3 is a front elevation of the front fork and handle bar detached from the main frame.

Figure 4 is a side elevation of the parts shewn by Figure 3.

Figure 5 is a plan of the frame carrying the rear wheel and engine.

Figure 6 is a section of the main frame on line *x x* of Figure 1.

Figure 7 is a side elevation of the frame carrying the rear wheel and engine and attendant parts.

According to a convenient embodiment of this invention, as applied to a motor cycle, the machine comprises a main frame 1 which may be formed of two metal pressings which are jointed together longitudinally of the frame. The members of the frame may be channelled as seen in cross section. This construction of frame is given by way of example only and may be of any other desired construction or shape. A frame 2 is mounted to pivot about the axis 3 on this frame 1, such frame 2 supporting the rear wheel 4. The upper end of this frame 2 is spring supported from the frame 1 by means of the lead spring 5. The frame 2 carries the engine 6 and the attendant parts such as the gear box and magneto. The cylinder heads of the engine are held by set pins 7 which pass through transverse bars 2$^b$ of the frame 2. The frame 2 is fixed to the shaft 8 the axis of which coincides with the axis 3 carried by the crank case of the engine, and such shaft is pivotally mounted, as shewn, in the steel plates 9 of the frame 1. It will thus be seen that the rear wheel is spring mounted and the frame carrying the engine and attendant parts is also spring mounted thus reducing wear and tear of the engine. It will also be seen that the rear wheel will vibrate concentric with the driving sprocket, pulley or driving member 56 of the engine, thereby not interfering with the drive during such vibration. The rod shewn, in the steel plates 9 of the frame 1.

The spring 5 is riveted to the underside of the top member of the frame 1 and is preferably carried forward to control the spring fork 12. According to one convenient construction the fork comprises a member 13 carrying the front wheel, which member is slidably mounted in the head of the frame 1 through the medium of the rotatably mounted collar 14, which collar carries the trunnions 15 upon which are mounted the blocks 16 adapted to travel in the slots 17 in the head of the frame 1. The collar 14 is mounted on ball bearings at its upper and lower ends. The handle bar 18 is rotatably mounted on the head of the frame 1 in suitable ball bearings and such handle bar carries a member 19 having a slot 20 therein for receiving the projection 21 carried by the member 13. The collar 14 carries a projection 22 which is connected to the spring 5 by means of the link 23. The front fork can therefore travel upwardly and pivot on the trunnions 15 under the control of the spring 5.

The petrol and oil tank is conveniently fitted to the frame 1 in the position as shewn. With the machine thus constructed the parts are spring balanced substantially around the centre of load of the machine.

The saddle 24 is spring carried from the frame 1 conveniently by means of the leaf spring 25 fixed to the upper member of the frame 1 and by two leaf springs 26 secured on brackets 27 on the frame 1, Claims, 1. A motor cycle comprising a main frame, a leaf spring carried thereby, a frame carrying the rear wheel and engine pivotally mounted on the main frame under the control of the said leaf spring and a fork mounted on the main frame under the control of the said leaf spring.

2. A motor cycle comprising a main frame, a leaf spring carried thereby, a frame carrying the rear wheel and engine pivotally mounted on the main frame under the control of the said leaf spring, a fork slidably mounted in the head of the main frame under control of said leaf spring, a handle bar rotatably mounted on the head of the main frame controlling the turning of the fork.

In witness whereof I have signed this specification.

FREDERICK JOHN HENRY PHILLIPS.